United States Patent [19]

Sakaguchi et al.

[11] E Re. 31,152

[45] Reissued Feb. 15, 1983

Best Available Copy

[54] ALARM BUZZER

[75] Inventors: Mitsuo Sakaguchi; Hikoji Iwasaki; Shigeo Shimoya, all of Tokyo, Japan

[73] Assignee: Kobishi Electric Co., Ltd., Japan

[21] Appl. No.: 47,091

[22] Filed: Jun. 11, 1979

Related U.S. Patent Documents

Reissue of:

[64] Patent No.: 4,075,626
Issued: Feb. 21, 1978
Appl. No.: 765,466
Filed: Feb. 4, 1977

[30] Foreign Application Priority Data

Nov. 11, 1976 [JP] Japan ..... 51-151613[U]
Nov. 11, 1976 [JP] Japan ..... 51-151614[U]
Nov. 11, 1976 [JP] Japan ..... 51-151615[U]

[51] Int. Cl.[3] ..... G10K 1/00

[52] U.S. Cl. ..... 340/388; 340/384; 340/392

[58] Field of Search ..... 340/388

[56] References Cited

U.S. PATENT DOCUMENTS 3,974,499 8/1976 Shigemori ..... 340/388
4,075,626 2/1978 Sakaguchi ..... 340/388
4,097,861 6/1978 Pariza ..... 340/388

*Primary Examiner*—Harold I. Pitts
*Attorney, Agent, or Firm*—Keith D. Beecher

[57] ABSTRACT

An alarm buzzer comprising an electromagnet, a yoke on which said electromagnet is mounted while maintaining insulation from the housing, an armature which is held with a plate spring on said yoke and is attracted by said electromagnet, a vibratory plate which contacts said armature, and a housing which incorporates the above components, wherein the bobbin of said electromagnet is made of an insulating material and consists of a hollow cylinder which receives an iron core in it and is wrapped with coil on its outer periphery, first flange provided on one end of said hollow cylinder, second flange provided on the other end of the hollow cylinder and at least one hollow projection provided on said second flange in the direction parting from said first flange, said yoke is provided with at least one hole into which said hollow projection of the bobbin is inserted, and the bobbin and the yoke are fixed to the housing of the alarm buzzer by a fixture which is inserted into the hollow projection of the bobbin inserted into said hole of the yoke.

17 Claims, 12 Drawing Figures

ALARM BUZZER

Matter enclosed in heavy brackets [ ] appears in the original patent but forms no part of this reissue specification; matter printed in italics indicates the additions made by reissue.

BACKGROUND OF THE INVENTION

The present invention relates to the alarm buzzer which is to be attached to a printed circuit board and operates to generate a warning buzzer sound upon emergencies such as fire and gas leakage.

Various types of alarming devices have been developed to prevent casualty due to fire and gas leakage. For example, some types of the alarming devices which are known to operate with an alarm signal which is generated by amplifying a variation of weak current which is detected when a smoke or gas passes through an air which is ionized by a weak radioactive ray and supplied with the weak current, or utilize a light instead of the radioactive ray. These types of alarming devices employ the printed circuit boards B' on which electronic parts which detect smoke or gas and amplify the current are mounted with the alarm buzzer A'. (See FIG. 1). The alarm buzzer A' comprises, as shown in FIG. 2, the electromagnet 1', yoke 2' to which the electromagnet 1' is attached while being insulated, armature 4' which is connected with the plate spring to the yoke 2' and vibratory plate 5' which are incorporated in the housing 6'. The lead wire 7' of one power line connected to the housing 6' and the lead wire 9' of the other power line connected to one end of the coil 8' of the electromagnet 1' are attached to the printed circuit board 3'. When the power supply is connected to the lead wires 7' and 9', the current passes through the lead wire 9' to the coil 8' and through the plate spring 3', armature 4', vibratory plate 5', housing 6' to the lead wire 7'. Then the electromagnet is energized to attract the armature 4' and consequently the contacts 4a' and 5a' of the armature 4' and the vibratory plate 5' is electrically disconnected to de-energize the electromagnet 1'. The above procedure of the operation is repeated to vibrate the vibratory plate 5' and the alarm buzzer sound is generated. The counter electromotive force is generated by the coil 8' the instant the contact 4a' of the armature 4' and the contact 5a' of the vibratory plate 5' are disconnected and the spark is produced between the contacts 4a' and 5a'. At the same time, a high voltage is applied to the power supply circuit and therefore the contacts 4a' and 5a' are melted and damaged on their surfaces. For this reason, the lead wire 10' is connected to the plate spring 3' to prevent such damage.

Conventional alarm buzzers carry the following various problems.

(1) The yoke 2' is fixed to the base of the housing 6' with rivets and both the yoke 2' and the housing 6' are made of conductive materials. To ensure the insulation, an insulation bush is inserted into the hole provided in the yoke 2' and the rivet should be driven into this insulation bush. Preparation of the insulation bush and insertion of the bush into the hole of the yoke 2' require more efforts than expected.

(2) One end of the iron core of the electromagnet is fixed to the yoke 2' to fix the bobbin 11' of the electromagnet to the yoke 2' and the flange 21' is provided on the other end of the iron core. However, such flange raises the production costs of the iron core and complicates the assembly work of the alarm buzzer.

(3) For attaching the alarm buzzer to the printed circuit board B', the bracket 12' is attached to the bottom of the housing 6' and the bracket 12' is attached to the printed circuit board B' with screws 13'. However, this kind of work for installation also requires a great deal of effort.

(4) The lead wires 7', 9' and 10' are inserted into the holes provided in the printed circuit board B' and soldered to the rear side of the printed circuit board B'. This work is troublesome.

(5) As shown in FIG. 3, the plate spring 3' is attached together with the lug terminal 14' to the yoke 2' and the lead wire 10' is soldered to this lug terminal 14'. This work takes a long period of time.

As described above, the conventional alarm buzzers employ many parts and require troublesome work such as soldering, machining of the iron core, fixing by screws etc., resulting in expensive production costs and causing automation of the manufacturing to be difficult.

SUMMARY OF THE INVENTION

The first object of the present invention is to provide the alarm buzzer which can easily be attached to the housing and does not require the insulating bush.

The second object of the invention is to provide the alarm buzzer which does not require such machining as necessary for the convenient iron cores.

The third object of the invention is to provide the alarm buzzer for which the bracket and screws for attaching the alarm buzzer to the printed circuit board can be omitted and the above installation work can be automated.

Other objects of the invention are disclosed in the following description.

The present invention provides the alarm buzzer comprising an electromagnet, a yoke on which said electromagent is mounted while maintaining insulation from the housing, an armature which is held with a plate spring on said yoke and is attracted by said electromagent, a vibratory plate which contacts said armature, and a housing which incorporates the above components, wherein the bobbin of said electromagnet is made of an insulating material and consists of a hollow cylinder which receives an iron core in it and is wrapped with coil on its outer periphery, first flange provided on one end of said hollow cylinder, second flange provided on the other end of the hollow cylinder and at least one hollow projection provided on said second flange in the direction parting from said first flange, said yoke is provided with at least one hole into which said hollow projection of the bobbin is inserted, and the bobbin and the yoke are fixed to the housing of the alarm buzzer by a fixture which is inserted into the hollow projection of the bobbin inserted into said hole of the yoke.

DETAILED DESCRIPTION OF PREFERRED EMBODIMENTS

Figure 1:
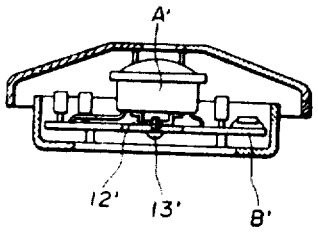
FIG. 1 is a front view showing the alarm buzzer built in the conventional alarm device.
Figure 2:
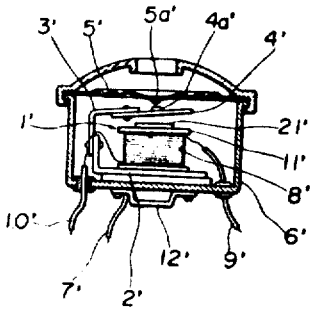
FIG. 2 is a sectional view of the alarm buzzer shown in FIG. 1.
Figure 3:
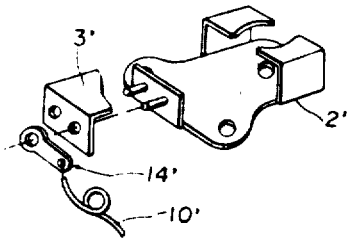
FIG. 3 is a disassembled perspective view showing connection of the yoke with the plate spring and the lead wire.
Figure 4:
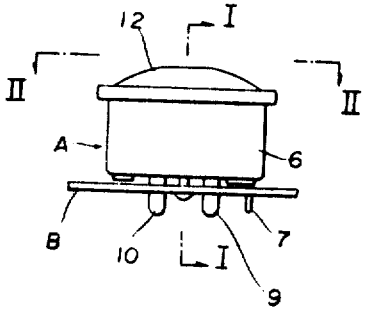
FIG. 4 is a front view of the alarm buzzer of the present invention.
Figure 5:
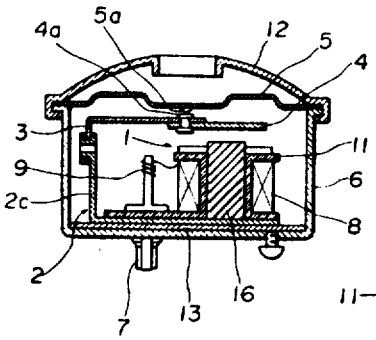
FIG. 5 is a sectional view along the line I—I in FIG. 6.
Figure 6:
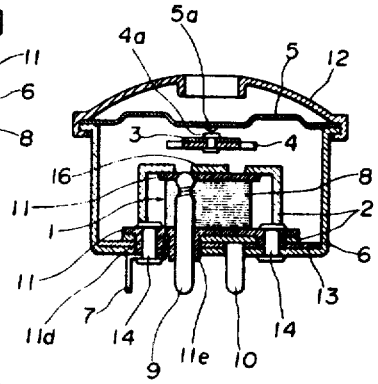
FIG. 6 is a sectional view along the line II—II in FIG. 4.
Figure 7:
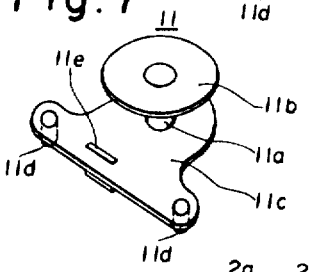
FIG. 7 is a perspective view of the bobbin.
Figure 8:
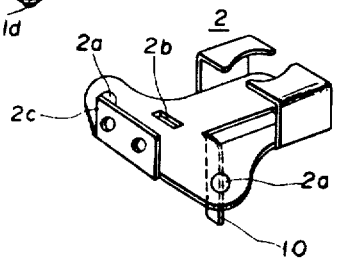
FIG. 8 is a perspective view of the yoke.

The following describes the embodiments according to the present invention, referring to FIG. 4 and the following drawings.

The alarm buzzer A is comprised of the electromagnet 1, yoke 2 which insulates said electromagnet 1 at the fixing position, armature 4 which is held on said yoke 2 with the plate spring 3, vibratory plate 5 with which said armature contact and housing 6 which houses the above components, wherein the lug terminal 7 is provided in contact with the bottom of the housing 6 and the plate type terminal 9 is connected to one end of the coil 8 of the electromagnet 1. A part of said yoke 2 is cut and raised to form the nail type terminal 10 and the top of said nail type terminal 10 is insulated from the housing 6 and projected from the bottom of the housing 6. The lug terminal 7 and the plate type terminal 9 are projected from the bottom of the housing 6.

Said electromagnet 1 comprises the bobbin 11 which is made of an insulating material such as a thermoplastic resin and consists of the hollow cylinder 11a and the first and second flanges 11b and 11c which are provided at both ends of said hollow cylinder 11a, and the iron core 16 which is inserted into the hollow cylinder 11a of the bobbin 11 of the coil 8 which is wound around the outer periphery of the hollow cylinder 11a. The second flange 11c is formed to have a larger surface area than the first flange 11b, the hollow projections 11d, 11d and 11e are provided to project from the extended part of the second flange 11c in the direction parting from said first flange 11b, and the plate type terminal 9 is inserted into said hollow projection while maintaining insulation from the housing 6.

The yoke 2 is made of a conductive material and is partly cut and raised to form the nail type terminal 10. The mounting holes 2a and 2a into which the hollow projections 11d and 11d of the bobbin 11 are inserted are provided at the specified positions of yoke 2 and the mounting hole 2b into which the hollow projection 11e of the bobbin 11 is provided at the specified position of yoke 2 and the one side of yoke 2 is bent to form the rise 2c for mounting the plate spring 3.

The vibratory plate 3 is pressure-fixed with a horn 12 to the periphery of the opening of the housing 6 thereby the contact 4a of the armature 4 comes in contact with the contact 5a of the vibratory plate 5.

The electromagnet 1 is mounted on the yoke 2 through the bobbin 11 which forms the electromagnet and the hollow projections 11d and 11d are inserted into the mounting holes 2a and 2a and the hollow projections 11e into the mounting hole 2b, respectively. The yoke 2 is mounted on the insulating plate 13 laid on the bottom of the housing 6, and the tip end of the plate type terminal 9 which is inserted into the hollow projection 11e and the tip end of the nail type terminal 10 are inserted into the holes provided in the bottom of the housing 6 to project therefrom while being maintained non-contacted with the housing 6. The rivets 14 and 14 are driven into the hollow projections 11d and 11d and the tips of these rivets are externally projected from the bottom of the housing 6 and staked. In this case, the rivets 14 and 14 and the yoke 2 are insulated by the hollow projections 11d and 11d which are provided between them. The lug terminal 7 is attached to contact an outer side of the bottom of the housing with one of said rivets 14.

Figure 9:
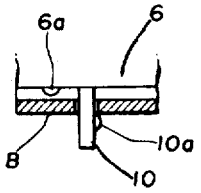
FIG. 9 is an explanatory view showing installation of the alarm buzzer to the printed circuit board.
Figure 10:
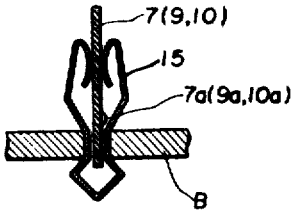
FIG. 10 is an explanatory view showing another installing means to install the alarm buzzer on the printed dircuit board and FIG. 11 and FIG. 12 are an explanatory view showing installation of the bobbin and the plate type terminal.
Figure 11:
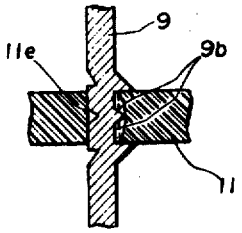
Figure 12:
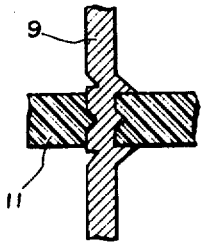

The terminals 7,9 and 10 are inserted into the printed circuit board B to attach the alarm buzzer A which is constructed as described above. In this case, if the projections 6a and 10a are provided at an outer side of the bottom of the housing 6 and the nail type terminal 10 as shown in FIG. 9, the alrm buzzer A can be prevented from coming off while the mounted and soldering of the alarm buzzer A onto the printed circuit board B are completed, and the stated of mounting of the alarm buzzer A is stabilized. Moreover, as shown in FIG. 10, the holding fixtures 15 can be soldered in advance to the printed circuit board B and the terminals 7,9 and 10 can be inserted into the holding fixtures 15. In this case, it is preferable to form the projections 7a, 9a and 10a on the terminals 7, 9 and 10. If the uneven part 9b is provided at the intermediate part of the plate type terminal 9 and the plate type terminal 9 is inserted into the hollow projection 11e so that the uneven part 9b comes in contact with the hollow projection 11e as shown in FIG. 11, the ambient part of the hollow projection 11e is melted due to the soldering heat produced when soldering one end of the coil 8 connected to the plate type terminal 9 to cover the uneven part 9b as shown in FIG. 12 and the plate type terminal 9 is fixedly attached to the bobbin 11.

The following describes the operation of the alarm buzzer shown in the above embodiment. The lug terminal 7 and the plate type terminal 9 are connected to the power supply and the current is supplied to the plate type terminal 9, coil 8, yoke 2, plate spring 3, armature 4, contacts 4a and 5a, vibratory plate 5, housing 6 and lug terminal 7 to energize the electromagnet 1.

When the electromagnet 1 is energized, the armature 4 is attracted by the iron core 12, the contacts 4a and 5a are disconnected and the electromagnet 1 is de-energized. When the electromagnet 1 is de-energized, the armature 4 is reset to the home position by the plate spring 3. When the armature is reset to the home position, the current flows again and the electromagnet 1 is energized. The vibratory plate 5 is oscillated by repetition of the above operation to generate the alarm sound. The coil 8 generates the counter electromotive force when the contacts 4a and 5a are disconnected and a spark takes place between the contacts 4a and 5a. However, the contacts 4a and 5a are prevented by the nail type terminal 10 from damage.

The fixture to be inserted into the hollow projection 11d need not be a rivet and the other fixture which serves similarly can be used. More than one fixture is sufficient for use. The hollow projection 11e to be provided in the second flange need not be at midway between the hollow projections 11d and 11d. The terminal 9 to be inserted into the hollow projection 11e is not restricted to a plate type and other types of terminals such as a bar type can be used but the plate type terminal is preferable for convenience in assembly. Moreover, the surface area of the first flange can be made equal to the surface area of the second flange.

As known from the above detailed description, in case of the alarm buzzer according to the present invention, the mounting of the yoke and the bobbin on the housing can easily be performed and the insulating bush which has conventionally been required can be omitted. Also the machining necessary for the conventional iron cores in not required. The bracket and screws conventionally necessary for attaching the alarm buzzer to the printed circuit board can be omitted. Furthermore, the soldering work of the lead wires can be vastly reduced. When a thermoplastic resin is used as the material for the bobbin, the terminal 9 and the hollow projection can be fixed together in the soldering work of the terminal 9 and the coil. When providing the projection on the terminals 7,9 and 10 using a printed circuit board with the holding fixture, the process for fixing the terminals 7, 9 and 10 to the printed circuit board can be automated. Since the alarm buzzer according to the invention is far more improved than the conventional types, the production costs of the alarm buzzer can be greatly reduced.

What we claim is:

1. An alarm buzzer comprising an electromagnet, a yoke on which said electromagnet is mounted while maintaining insulation from a housing, an armature which is held with a plate spring on said yoke and is attracted by said electromagnet, a vibratory plate which contacts said armature, and a housing which incorporates the above components wherein a bobbin of said electromagnet is made of an insulating material and consists of a hollow cylinder which receives an iron core in it and is wrapped with coil on its outer periphery, first flange provided on one end of said hollow cylinder, second flange provided on the other end of the hollow cylinder and at least one hollow projection provided on said second flange in a direction parting from said first flange, said yoke is provided with at least one hole into which said hollow projections of the bobbin is inserted, and the bobbin and the yoke are fixed to the housing of the alarm buzzer by a fixture which is inserted into the hollow projection of the bobbin inserted into said hole of the yoke.

2. An alarm buzzer as claimed in claim 1, wherein said fixture is a rivet.

3. An alarm buzzer as claimed in claim 1, wherein more than two hollow projections are provided and said fixture is inserted into at least one hollow projection and a terminal into the other hollow projection, one end of said terminal being projected outside the housing from the hollow projection.

4. An alarm buzzer as claimed in claim 1, wherein a part of the yoke is cut and raised in the same direction as said hollow projection, the tip end of the raised part being inserted into a hole provided in the bottom of the housing as is kept insulated and being projected outside the housing.

5. An alarm buzzer as claimed in claim 3, wherein a part of the yoke is cut and raised in the same direction as said hollow projection, the tip end of the raised part being inserted into a hole provided in the bottom of the housing as is kept insulated and being projected outside the housing.

6. An alarm buzzer as claimed in claim 5, wherein said bobbin is made of a thermoplastic resin, an uneven part is provided at a part of said terminal located inside said hollow projection of the bobbin and said hollow projection which is melted by a heat generated when soldering the coil to the terminal engages with said uneven part of the terminal, thereby the terminal is fixed to the hollow projection.

7. An alarm buzzer as claimed in claim 5, wherein a lug terminal is fixed with said fixture on the outer surface of the bottom of said housing.

8. An alarm buzzer as claimed in claim 7, wherein the projections are provided on the outer surface of the bottom of the housing and on the terminals for temporarily securing the alarm buzzer before soldering it to the printed circuit board.

9. An alarm buzzer as claimed in claim 7, wherein a projection is provided on each terminal in order to insert and fix the terminal of the alarm buzzer into the holding fixture fixed on the printed circuit board.

*10. An improved horn for generating an audible signal, comprising a housing formed of electrically conductive material having walls the margins of which define an opening; an electro-magnetic coil within said housing and having a pair of terminals connected to opposite sides of a winding thereof and extending exteriorly of said housing; a diaphragm of electrically conductive material positioned on said housing in electrical contact therewith over said opening and closing said housing; a striker member of magnetically permeable and electrically conductive material; and means for mounting said striker in said housing between said diaphragm and said coil in operative association with said coil for movement away from and strikingly against said diaphragm to generate noise, said means normally resiliently urging said striker toward and into electrical contact with said diaphragm, electrically insulating said striker from direct electrical contact with said housing, and including a terminal extended exteriorly of said housing and electrically connected with said striker.*

*11. An improved horn as in claim 10, a cover, said housing having an outwardly extending lip about said opening, said diaphragm and cover resting on said lip, said housing and cover having interengaging portions securing said cover to said housing with said diaphragm therebetween.*

*12. An improved horn as in claim 11, said cover having conical-frustrum shaped walls and a poart therethrough for the passage of noise generated by said horn.*

*13. An improved horn as set forth in claim 10, said coil having a pair of magnetic poles, said striker being mounted between said diaphragm and one of said poles, means providing a magnetically permeable path for magnetic flux at the other of said poles to a position closely spaced from said one pole to provide a relatively high density expanding field of magnetic flux thereat to attract said striker away from said diaphragm and toward said one pole when said coil is energized.*

*14. An improved horn as in claim 10, said means for mounting said striker including a bracket of electrically conductive material mounted in said housing, electric insulator means between said bracket and said housing, and a spring of electrically conductive material extended between said bracket and said striker and normally urging said striker into electrical contact with said diaphragm, said terminal electrically connected with said striker being electrically connected with said bracket.*

*15. An improved horn as in claim 14, said coil having a pair of magnetic poles and being mounted on said bracket, said striker being between one of said poles and said diaphragm, the other of said poles being magnetically linked with said bracket and said bracket having portions provid-*

*ing a magnetically permeable path for magnetic flux at said other pole to a position closely spaced from said one pole to provide a relatively high density expanding field of magnetic flux thereat to attract said striker away from said diaphragm and toward said one pole when said coil is energized.*

*16. An improved horn as in claim 15, a first electrical contact mounted on said diaphragm and electrically connected therewith, and a second electrical contact electrically connected with said spring and mounted for movement with said striker, said spring normally urging said second contact into electrical engagement with said first contact.*

*17. An improved horn as in claim 14, said coil including a bobbin of electrically insulating material, said bobbin being mounted on said bracket and said bobbin, bracket, insulator means and housing having aligned passages, said bobbin having a shoulder formed around said passage therein and extending into said bracket passage, and fastener means extended through said passages and between said bobbin and housing to mount said bobbin, bracket and insulator means in said housing, said bobbin shoulder electrically insulating said fastener from said bracket whereby said bracket is maintained electrically insulated from said housing.*

* * * * *